(12) United States Patent
Breitfuβ et al.

(10) Patent No.: US 9,790,989 B2
(45) Date of Patent: Oct. 17, 2017

(54) LINEAR GUIDE COMPRISING AT LEAST TWO PROFILE-MEMBERS

(71) Applicant: Konecranes Plc, Hyvinkää (FI)

(72) Inventors: Markus Breitfuβ, Thalgau (AT); Manfred Josef Wallner, Inzell (DE)

(73) Assignee: Konecranes PLC, Hyvinkää (FI)

( * ) Notice: Subject to any disclaimer, the term of this patent is extended or adjusted under 35 U.S.C. 154(b) by 0 days.

(21) Appl. No.: 14/409,690

(22) PCT Filed: Jun. 19, 2013

(86) PCT No.: PCT/EP2013/062681
§ 371 (c)(1),
(2) Date: Dec. 19, 2014

(87) PCT Pub. No.: WO2014/001161
PCT Pub. Date: Jan. 3, 2014

(65) Prior Publication Data
US 2015/0152912 A1    Jun. 4, 2015

(30) Foreign Application Priority Data
Jun. 26, 2012   (DE) .......................... 10 2012 012 530

(51) Int. Cl.
*F16C 29/02*    (2006.01)
*F16C 29/12*    (2006.01)
*F16C 29/00*    (2006.01)

(52) U.S. Cl.
CPC ............ *F16C 29/02* (2013.01); *F16C 29/005* (2013.01); *F16C 29/008* (2013.01); *F16C 29/12* (2013.01)

(58) Field of Classification Search
CPC ...... F16C 29/001; F16C 29/008; F16C 29/12; F16C 29/123; F16C 29/126; F16C 29/02; F16C 29/005
See application file for complete search history.

(56) References Cited

U.S. PATENT DOCUMENTS 3,398,999 A * 8/1968 Halvorsen ............. F16C 29/005
384/45
4,040,679 A * 8/1977 Teramachi ............... B23Q 1/40
384/45
(Continued)

FOREIGN PATENT DOCUMENTS

CN         202132386 U    2/2012
DE           3834900 A1    4/1990
(Continued)

OTHER PUBLICATIONS

English language PCT International Search Report and Written Opinion mailed Sep. 23, 2013, received in corresponding PCT Application No. PCT/EP13/62681, 9 pgs.
(Continued)

*Primary Examiner* — Alan B Waits
(74) *Attorney, Agent, or Firm* — Grossman Tucker Perreault & Pfleger, PLLC

(57) ABSTRACT

The invention relates to a linear guide (1) having at least one inner and at least one outer profile-member (2, 3), the outer profile-member (3) at least partially surrounding the inner profile-member (2) and the profile-members (2, 3) being guided one inside the other by means of at least two linear guiding means which are preferably arranged diametrically opposite each other, wherein at least a portion of a first linear guiding means is arranged in a floating manner.

19 Claims, 6 Drawing Sheets

(56) References Cited

U.S. PATENT DOCUMENTS

Figure 1:
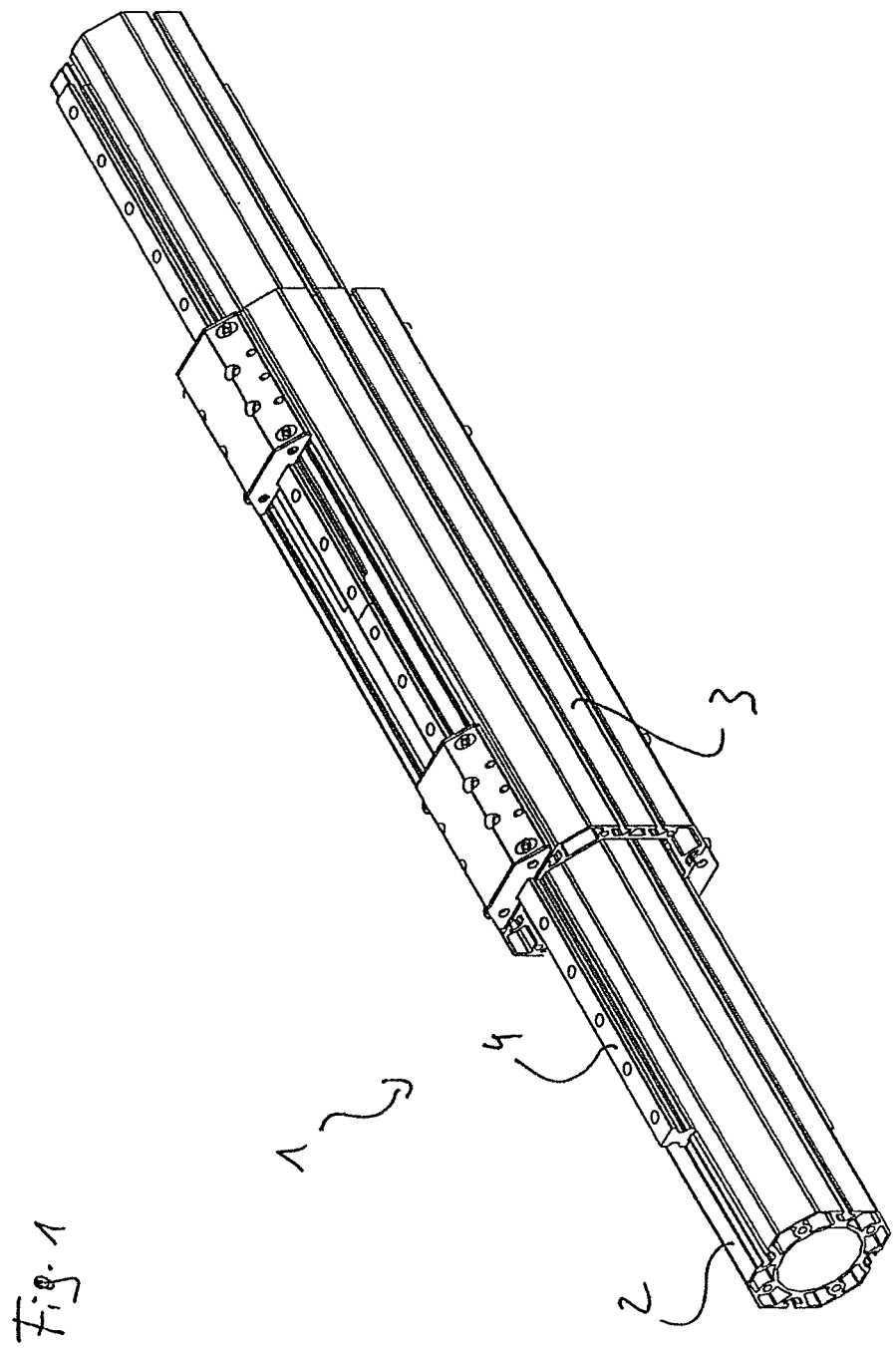

| | | | |
|---|---|---|---|
| 4,527,840 A * | 7/1985 | Mugglestone | F16C 29/001 384/45 |
| 4,566,738 A | 1/1986 | Fasth | |
| 4,637,738 A * | 1/1987 | Barkley | B23Q 1/36 384/38 |
| 4,831,888 A * | 5/1989 | Tessier | F16C 29/00 73/862.541 |
| 5,249,867 A * | 10/1993 | Iida | F16C 29/001 384/45 |
| 5,388,913 A | 2/1995 | Cawley et al. | |
| 5,984,254 A | 11/1999 | Baloche et al. | |
| 6,227,708 B1 | 5/2001 | Rixen et al. | |
| 6,402,381 B1 | 6/2002 | Shirai et al. | |
| 6,648,508 B1 | 11/2003 | Brunk et al. | |
| 6,969,199 B2 * | 11/2005 | Moshammer | F16C 29/001 384/38 |
| 7,029,214 B2 * | 4/2006 | Shiba | B23Q 1/28 188/166 |
| 7,080,943 B2 * | 7/2006 | Hisanobu | B30B 15/041 384/38 |

FOREIGN PATENT DOCUMENTS

| | | | |
|---|---|---|---|
| DE | 9315178 U1 * | 2/1995 | B23Q 1/40 |
| DE | 10342386 B3 * | 4/2004 | B29C 45/1761 |
| DE | 202006013952 U1 | 11/2006 | |
| JP | S62188636 A | 8/1987 | |
| JP | 2012241889 * | 12/2012 | |
| JP | 5208621 B2 * | 6/2013 | F16C 29/001 |

OTHER PUBLICATIONS

English language PCT International Preliminary Report on Patentability mailed Jun. 25, 2014, received in corresponding PCT Application No. PCT/EP13/62681, 6 pgs.

* cited by examiner

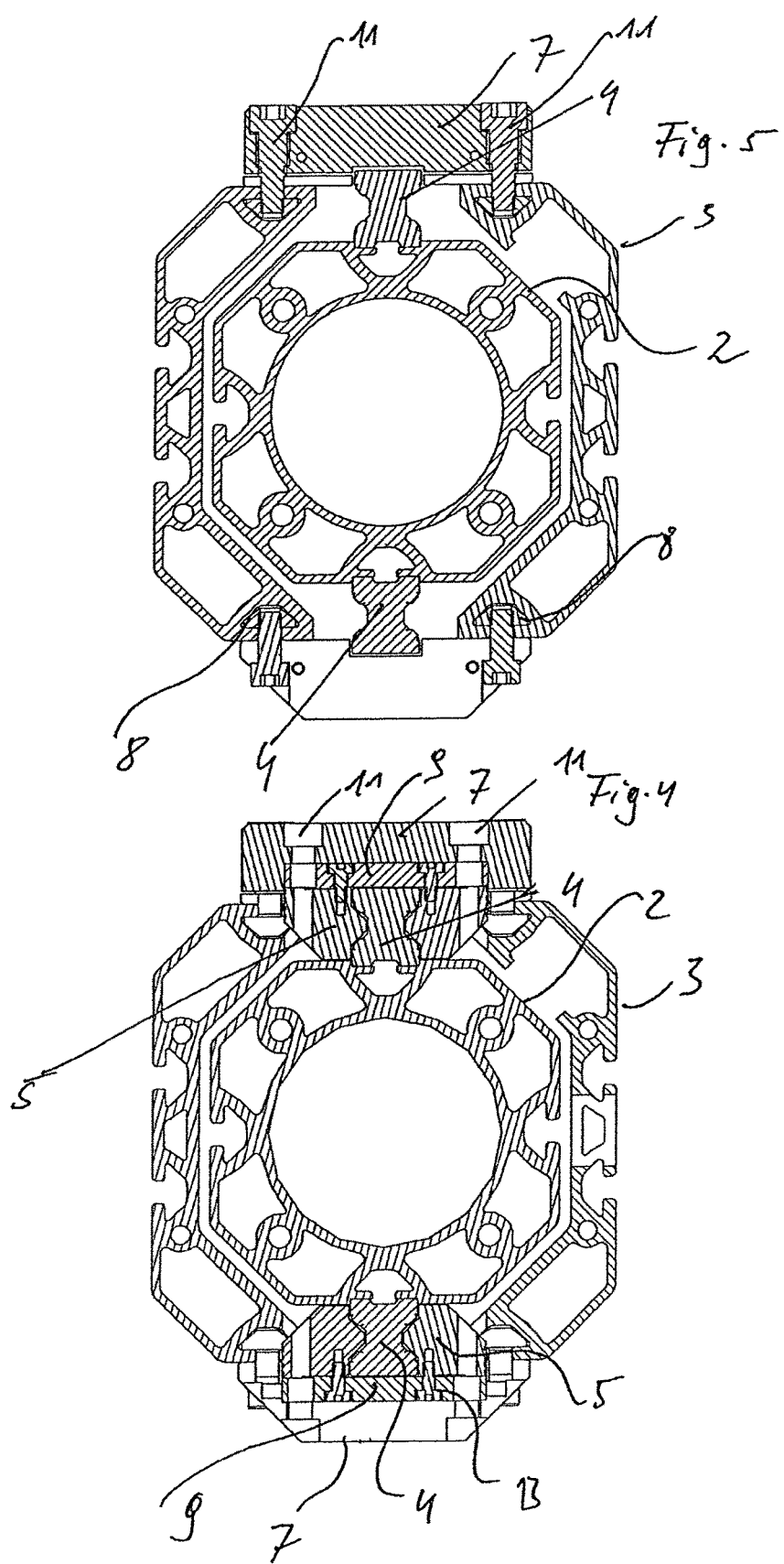

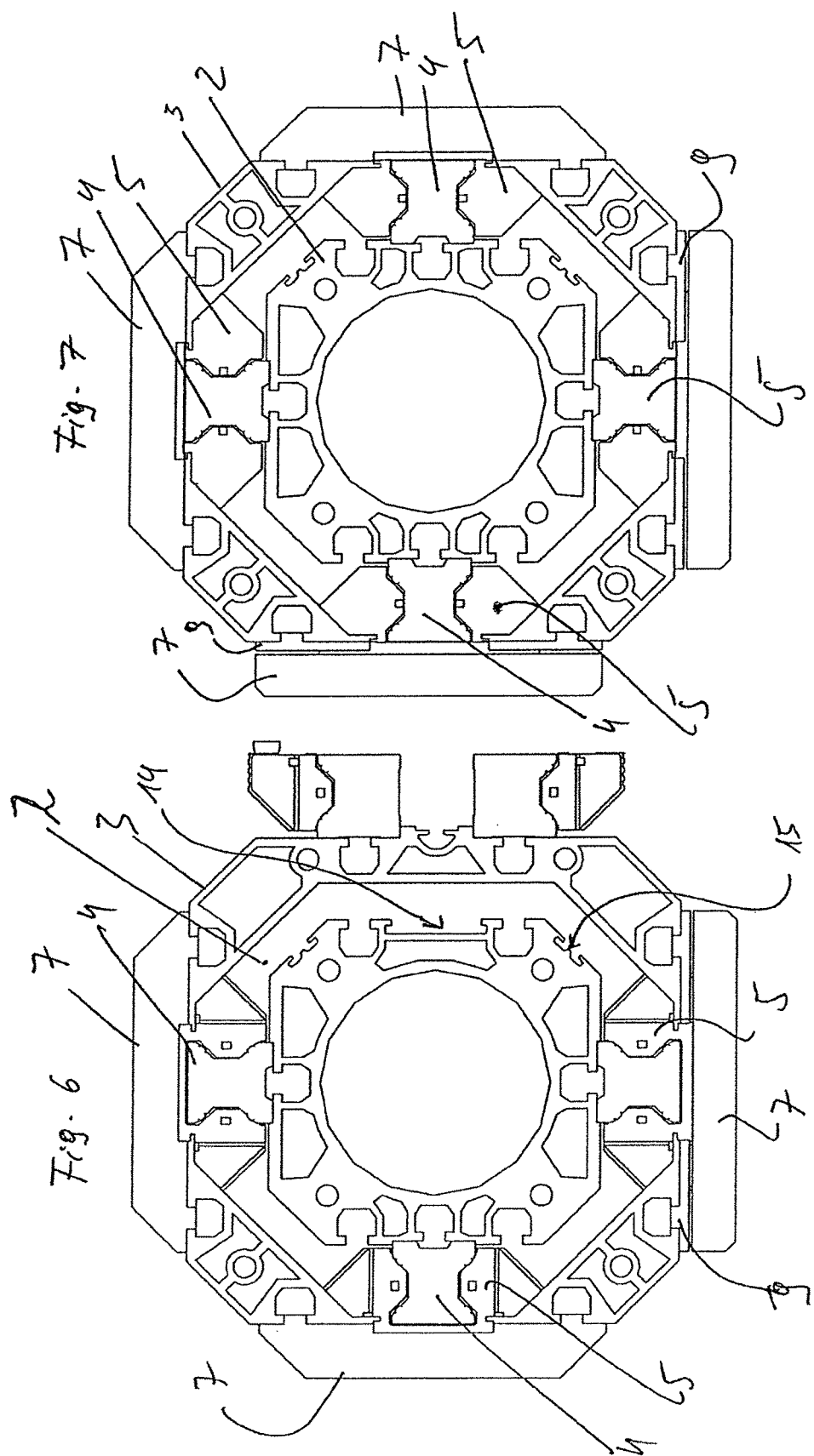

LINEAR GUIDE COMPRISING AT LEAST TWO PROFILE-MEMBERS

The invention relates to a linear guide comprising at least two profile-members, preferably at least two extruded profile-members.

Linear guides are used, for example, in telescopic arrangements or roller guides inter alia in the field of mechanical engineering. Linear guides in the context of the invention comprise at least two profile-members which can carry out a predetermined relative movement relative to each other. A so-called inner profile-member is at least partially surrounded by a so-called outer profile-member. In order to guide the linear movement, there are arranged between the profile-members linear guiding means which limit the relative movement between the profile-members of the linear guide in such a manner that only the desired relative movement between the profile-members is permitted. In order to achieve reliable, torsion-free guiding, the linear guiding means are mounted at least at two opposing profile-member sides.

U.S Pat No. 4,566,738 discloses a positioning apparatus in which a runner is arranged to travel backwards and forwards by way of a threaded spindle extending in the lengthwise direction of the apparatus and engaging the runner. The runner is slidably mounted on three guide members positioned symmetrically around the spindle and in parallel therewith. The guide members are part of guiding profiled members forming part of the housing of the positioning apparatus. Special slide surfaces are arranged on the guide members. The positioning apparatus furthermore comprises bushings mounting said runner, said bushings being movable in the transverse direction of said positioning apparatus.

U.S Pat. No. 6,648,508 discloses a linear guide which comprises a travelling carriage having track rollers for support and for rolling along a guide rail, such track rollers, each of which roles on the guide rail, being mounted in pairs for rotation on a first support that is arranged on a first carriage plate of the travelling carriage. The travelling carriage comprises a further carriage plate with a second support arranged thereon, and the track rollers rotatably mounted on said second support for rolling on a further guide rail. One of the supports is designed as a fixed bearing, the other support being designed as a movable bearing.

A similar alignment compensation system for use with parallel linear bearings is for example disclosed in U.S Pat. No. 5,388,913. Yet another guiding device with a carrier which allows for compensation of tolerances resulting from twist of the guide rails is disclosed in U.S Pat. No. 6,227,708 B1.

Since profile-members, such as, for example, extruded aluminum profile-members, have production-related dimensional tolerances, the support faces of the linear guiding means must be mechanically further processed in a complex manner since otherwise occurrences of distortion up to the level of jamming may occur. Alternatively, the linear guiding means may be underlaid with spacer disks or spacer bars, so-called shims, in order thereby to compensate for occurrences of unevenness in the profile-members.

This object is achieved according to the invention by a linear guide with the features of claim 1. Advantageous embodiment may be derived from the dependant claims.

Owing to the measure according to the invention, it can be ensured that potential height tolerances of the profile-members are compensated for by means of the profile-member lengths, which is not possible using shims. The dimensional tolerances of the profile-members, in particular the inner profile-member, are compensated for by at least one linear guiding means being constructed as a movable bearing.

In an advantageous variant of the linear guide according to the invention, there is provision for all the linear guiding means to be constructed as movable bearings so that the profile-members are completely arranged in a floating manner one inside the other.

In an alternative advantageous embodiment of the linear guide according to the invention, at least one additional linear guiding means forms a fixed bearing.

In the preferred variant of the linear guide according to the invention, a linear guiding means is constructed as a fixed bearing, whereas a diametrically opposed linear guiding means is constructed as a movable bearing so that in this manner a defined, torsion-resistant guide is ensured, at the same time with compensation of height tolerances.

With the linear guide according to the invention, there is provision for the first linear guiding means to have at least two degrees of freedom. For example, the first linear guiding means may be adjustable in an axis which extends transversely relative to the displacement direction of the profile-members relative to each other. In addition, the first linear guiding means may be rotatably or pivotably arranged about this axis.

With the linear guide according to the invention, there is provision for the linear guiding means each to be formed by a linear guiding rail and a complementary sliding member. The rail and the sliding member may be constructed, for example, as groove type profile-members, for example, as dovetail profile-members.

The sliding member of the first linear guiding means is arranged in a floating manner.

With the linear guide according to the invention, there is provision for the sliding member of the first linear guiding means to be freely displaceable transversely relative to the guiding direction of the profile-members in an axis which extends perpendicularly relative to the longitudinal extent of the complementary linear guiding rail.

For example, the sliding member of the first linear guiding means may be retained in a resiliently loaded manner in the direction towards the guide rail.

With the linear guide according to the invention, the sliding member of the first linear guiding means is further supported so as to be able to be rotated about at least one axis.

This sliding member is rotatably arranged in a ball joint.

For example, the linear guiding rail is connected to the inner profile-member and the sliding member is connected to the outer profile-member.

According to a preferred embodiment of the invention, at least one linear guiding rail, preferably all the linear guiding rails, is/are securely connected to the inner profile-member. As already set out above, a complex mechanical further processing operation of the support faces of the linear guiding rails is not necessary with the construction according to the invention.

In a particularly advantageous manner, at least one linear guiding rail is secured in a guiding groove of the inner profile-member by means of sliding blocks.

The sliding members are advantageously arranged on the outer profile-member.

According to an advantageous embodiment of the invention, the sliding members are each connected to the outer profile-member by means of a retention device, for example, in the form of a covering plate or a covering cap.

According to a further preferred embodiment of the invention, at least one retention device is connected to the outer profile-member so as to be able to be moved relative to the outer profile-member. The sliding member of the linear guide may be securely connected to the retention device since the floating support of the sliding member is achieved in that the retention device is connected to the outer profile-member so as to be able to be moved relative to the outer profile-member.

The retention device is advantageously secured to the outer profile-member by means of sliding bushes.

In a particularly preferred variant of the linear guide according to the invention, there is provision for at least the sliding member of the first linear guiding means to be retained with a ball joint in a bearing seat which is arranged in a bearing calliper member in a floating and preferably resiliently loaded manner. Owing to this arrangement, not only are height tolerances of the linear rails compensated for but also a "spherical" bearing with a height compensation is produced. Any dimensional tolerances in the width of the linear guiding rails are compensated for by means of the spherical bearing, which permits all possible degrees of freedom of the sliding member in terms of tilting and rotation.

As an alternative to the spherical bearing of at least one linear guiding means by means of a ball joint which is retained in a bearing seat, there may be provision, for example, for a ball head to be guided in a cylindrical bearing bush, the ball head then being able to be displaceable transversely relative to the guiding direction of the profile-members in the bearing bush and at the same time permitting a rotational movement of the sliding member about a vertical axis, that is to say, about an axis transversely relative to the guiding direction. In this instance, the ball head may also be constructed in a geometrically simplified manner as a, for instance, barrel-like pin.

According to another preferred embodiment of the invention, in particular in a variant of the linear guide in which at least the sliding member of the first linear guiding means can be freely displaced in a floating manner transversely relative to the guiding direction of the profile-members, there may be provision for a base plate to be arranged between the retention device and outer profile-member. The base plate may in this instance act, for example, as a support for fitting screws which are used to secure the retention device. As an alternative to such a structural configuration by means of fitting screws, there may also be provision for the guiding and securing to be achieved by separately constructed means.

According to another embodiment of the invention, the outer profile-member is constructed in several parts, preferably two, three or four parts. The multi-part construction of the outer profile-member has the advantage that, in particular with relatively large profile-member cross sections, the tool and production costs of the outer profile-member are reduced. The spacing of the various parts of the outer profile-member relative to each other may be ensured, for example, by means of the base plate.

According to another preferred embodiment of the invention, the position of the sliding member can be adjusted relative to the outer profile-member in order to center the inner profile-member in the outer profile-member. By means of the position of the sliding member relative to the outer profile-member, the position of the inner profile-member in the outer profile-member can be adjusted.

Figure 2:
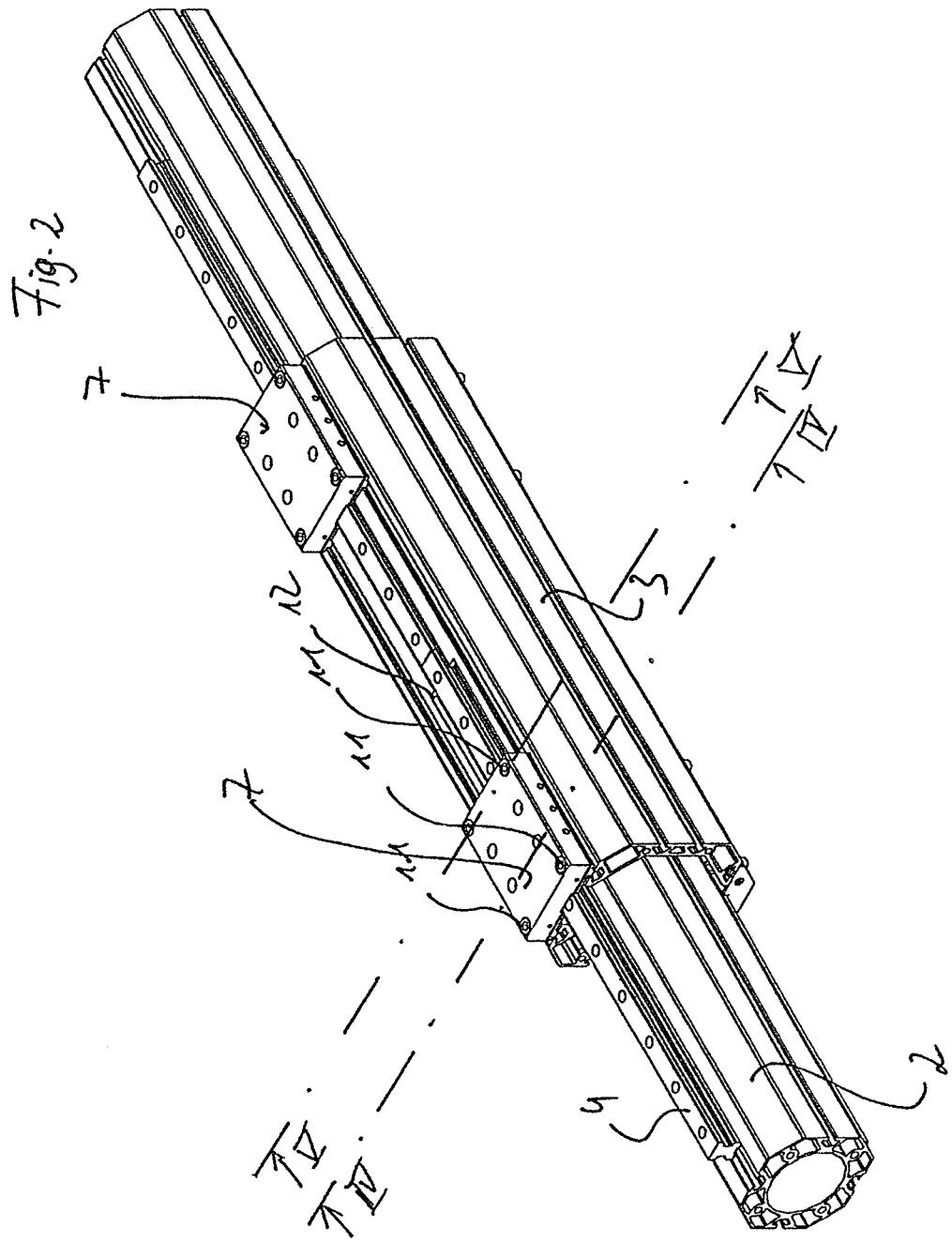
Figure 3:
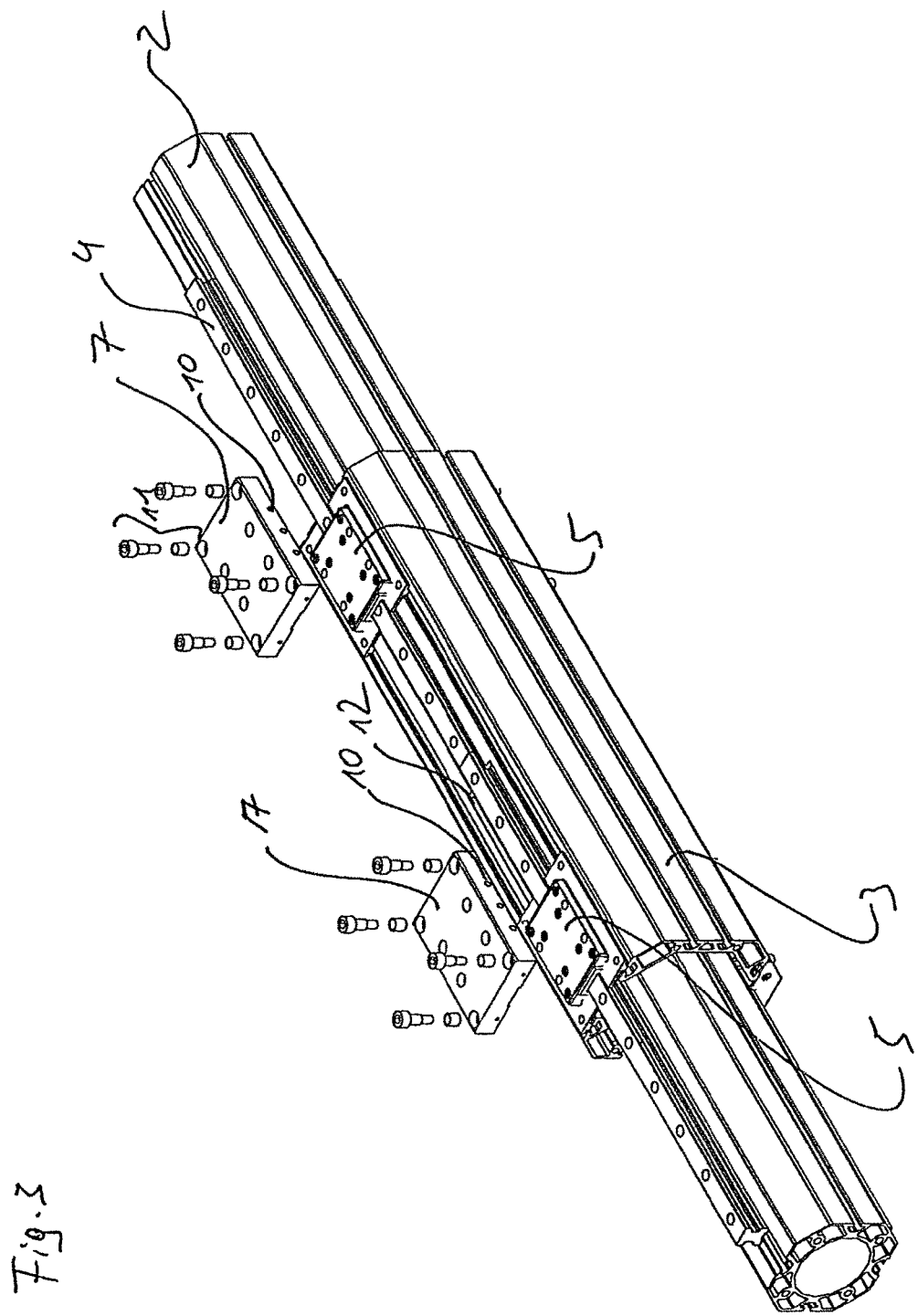
Figure 8:
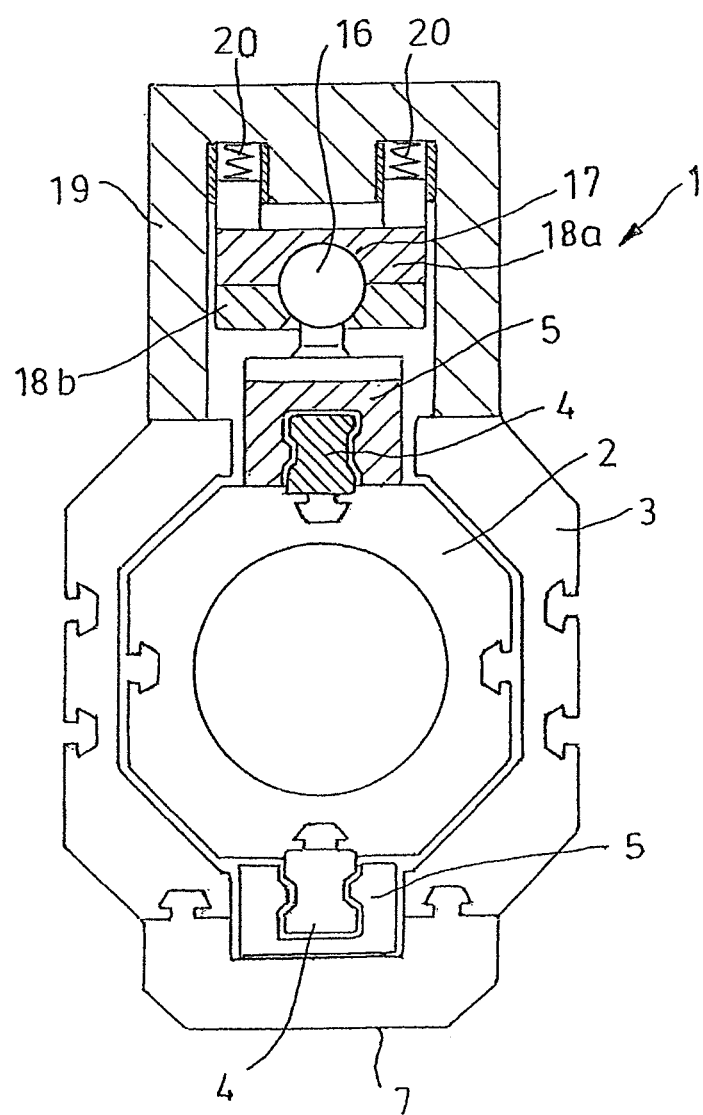

The invention is explained in greater detail below with reference to the embodiments illustrated in the figures, in which:

FIG. 1: shows a linear guide comprising at least two extruded profile-members according to the prior art, FIG. 2: shows a linear guide according to the invention comprising at least two extruded profile-members, FIG. 3: is an exploded illustration of the linear guide according to the invention from FIG. 2, FIG. 4: is a sectioned view through the linear guide according to the invention according to FIG. 2 along the lines IV-IV in FIG. 2, FIG. 5: is a sectioned view of the linear guide according to the invention according to FIG. 2 along the lines V-V in FIG. 2, FIG. 6: shows a linear guide according to the invention comprising two extruded profile-members with a three-part outer extruded profile-member, FIG. 7: shows a linear guide according to the invention comprising two extruded profile-members with a four-part outer extruded profile-member, and FIG. 8: is a cross section through a linear guiding profile-member according to another variant according to the invention.

FIG. 1 shows a linear guide 1 comprising an inner extruded profile-member 2 and an outer extruded profile-member 3. Between the inner extruded profile-member 2 and the outer extruded profile-member 3, there are arranged at opposing sides two linear guiding means which guide a relative movement between the inner extruded profile-member 2 and the outer extruded profile-member 3. The linear guiding means each comprise a linear guiding rail 4 and a sliding member 5.

The linear guiding rail 4 is arranged in a guiding groove 6 inside the inner extruded profile-member 2. The linear guiding rail 4 is connected to the outer extruded profile-member 3 by means of a retention device 7.

Owing to the production-related dimensional tolerances during the production of the inner extruded profile-member 2 and the outer extruded profile-member 3, occurrences of distortion may occur in the region of the linear guiding means during a relative movement between the inner extruded profile-member 2 and outer extruded profile-member 3.

FIG. 2 shows a linear guide according to the invention comprising an inner extruded profile-member 2 and an outer extruded profile-member 3. The linear guide 1 comprises two linear guiding means which are arranged between the inner extruded profile-member 2 and the outer extruded profile-member 3 at opposing sides. The linear guiding means serve to guide the relative movement between the inner extruded profile-member 2 and the outer extruded profile-member 3. The linear guide 1 according to the invention differs from the prior art in that, at least at one side, at least a portion of a linear guiding means is constructed in such a manner that at least a compensation of the height tolerances is carried out at that location.

The linear guiding means each comprise a linear guiding rail 4 and a sliding member 5. The linear guiding rails 4 are securely connected to the inner extruded profile-member 2. In the embodiment according to FIG. 2, the linear guiding rails are retained in a guiding groove 6 of the inner extruded profile-member 2 by means of sliding blocks 8.

The sliding members 5 are connected to the outer extruded profile-member 3 by means of a retention device 7. A floating support is thereby ensured. According to the embodiment illustrated, the sliding member 5 is securely connected to the retention device 7.

The retention device 7 is in the form of a covering cap in this instance.

A base plate 9 is arranged between the retention device 7 and the outer extruded profile-member 3.

The position of the sliding member 5 relative to the outer extruded profile-member 3 is constructed so as to be adjustable in order to be able to center the inner extruded profile-member 2 in the outer extruded profile-member 3. The position of the sliding member 5 relative to the outer extruded profile-member 3 can be changed by means of the grub screws 10.

According to the embodiment illustrated, the sliding member 5 illustrated at the top in the figure is constructed so as to be movable relative to the outer extruded profile-member 3, whilst the sliding member 5 illustrated in the lower region of FIG. 3 is securely connected to the outer extruded profile-member 3, that is to say, forms a fixed bearing. If occurrences of distortion now occur between the inner extruded profile-member 2 and the outer extruded profile-member 3 during relative movement, they can be compensated for by means of a relative movement of the upper sliding member 5 relative to the outer extruded profile-member 3 so that jamming of the relative movement between the inner extruded profile-member 2 and outer extruded profile-member 3 is prevented.

The relative movement between the outer extruded profile-member 3 and sliding member 5 in the upper region of the device 1 according to FIG. 2 is achieved by means of a relative movement between the retention device 7 and outer extruded profile-member 3.

The relative movement between the retention device 7 and outer extruded profile-member 3 is achieved by means of fitting screws which extend through a sliding bush 11.

A plurality of retention devices 7 with associated sliding members 5 may be arranged in the longitudinal direction of the outer extruded profile-member 3. At the upper side of the outer extruded profile-member 3, two such retention devices 7 with associated sliding members 5 are illustrated in FIG. 2.

In order to be able to insert the sliding member 5 into the outer extruded profile-member 3, the outer extruded profile-member 3 has at least one recess 12 which is at least slightly larger than the external dimension of the sliding member 5.

FIG. 3 is an exploded view of the linear guide 1 from FIG. 2. The inner extruded profile-member 2 has at opposing sides a linear guiding rail 4 which is retained in a guiding groove 6 inside the inner extruded profile-member 2 by means of sliding blocks.

In the outer extruded profile-member 3, two sliding members 5 are arranged in the upper region of the outer extruded profile-member 3 in the embodiment illustrated.

The sliding members 5 are securely connected to the retention device 7. The retention device 7 is connected to the outer extruded profile-member 3 by means of fitting screws with a sliding bush 11 via a base plate 9. The guiding of the fitting screws in the sliding bushes 11 enables a relative movement between the retention device 7 and outer extruded profile-member 3.

Using the grub screws 10, the position of the sliding member 5 relative to the outer extruded profile-member 3 can be changed, whereby the inner extruded profile-member 2 can be centerd in the outer extruded profile-member 3. The sliding members 5 are arranged in a recess 12 within the outer extruded profile-member 3.

FIG. 4 is a cross section through the linear guide 1 according to FIG. 2 in the region of the sliding members 5. The upper sliding member 5 is connected to the retention device 7 by means of a screw arrangement 13. The retention device 7 is connected to the outer extruded profile-member 3 by means of fitting screws with a sliding bush 11. Between the retention device 7 and the outer extruded profile-member 3 there is arranged a base plate 9 which is connected to the outer extruded profile-member 3 by means of sliding blocks 8.

The lower sliding member 5 is connected to the lower retention plate 7 in FIG. 4 by means of a screw arrangement 13. The lower retention device 7 is securely connected to the outer extruded profile-member 3 by means of sliding blocks 8.

The sliding members 5 cooperate in each case with a linear guiding rail 4 in order to guide the relative movement between the outer extruded profile-member 3 and the inner extruded profile-member 2. The linear rails 4 which are arranged at opposite sides of the inner extruded profile-member 2 are securely connected to the inner extruded profile-member 2 by means of sliding blocks 8. The linear rails 4 are in each case arranged inside a guiding groove 6 in the inner extruded profile-member 2.

FIG. 5 is a sectioned view through the linear guide 1 according to FIG. 2 in the region of the retention device 7, outside the sliding members 5. The retention device 7 illustrated at the top in FIG. 5 is connected to the outer extruded profile-member 3 so as to be movable relative to the outer extruded profile-member 3 by means of fitting screws with a sliding bush 11. A base plate 9 is arranged between the retention device 7 and outer extruded profile-member 3.

The retention device 7 in the lower region of the device according to FIG. 5 is securely connected to the outer extruded profile-member 3 by means of a screw arrangement 13 and sliding blocks 8.

Linear guiding rails 4 are connected to the inner extruded profile-member 2 at opposing sides. The linear guiding rails 4 are arranged between the inner extruded profile-member 2 and the outer extruded profile-member in order to guide a relative movement between the inner extruded profile-member 2 and outer extruded profile-member 3. The linear guiding rails 4 cooperate with sliding members 5. The linear guiding rails are constructed as dovetail profile-members, the sliding members 5 are constructed in a complementary manner thereto and engage around them. The sliding member 5 which belongs to the retention device 7 in the upper region of the device according to FIG. 5 is movably connected to the outer extruded profile-member 3 by means of the retention device 7, whilst the sliding member 5 which belongs to the retention device 7 in the lower region of FIG. 5 is securely connected to the outer extruded profile-member. Owing to the fact that the upper sliding member 5 is constructed so as to be movable relative to the outer extruded profile-member 3, height tolerances of the linear rails 4 and/or the inner extruded profile-member 2 can be compensated for.

FIG. 6 shows a linear guide 1 according to the invention, three linear guiding rails 4 being securely connected to the inner extruded profile-member 2. The linear guiding rails 4 are each connected to the inner extruded profile-member 2 in a guiding groove 6 within the inner extruded profile-member 2.

Sliding members 5 which are connected to the outer extruded profile-member 3 cooperate in each case with the linear guiding rails 4 in order to guide the relative movement between the inner extruded profile-member 2 and the outer extruded profile-member 3.

In the illustrated embodiment, the upper and the left-hand sliding member 5 is securely connected to a retention device 7, the retention device 7 being securely connected to the outer extruded profile-member 3. The sliding member 5 illustrated at the bottom in FIG. 6 is securely connected to a retention device 7, but with the retention device 7 being connected to the outer extruded profile-member 3 so as to be able to be moved relative to the outer extruded profile-member 3 by means of fitting screws which each extend through a sliding bush 11. A base plate 9 is arranged between the lower retention device 7 and outer extruded profile-member 3.

In the embodiment according to FIG. 6, the outer extruded profile-member 3 is constructed in three parts, the individual parts of the outer extruded profile-member 3 being fixed to each other by means of the fixed retention devices 7, that is to say, in the upper and in the left-hand region of FIG. 6. The fixing of the individual parts of the outer extruded profile-member 3 in the lower region is achieved by means of the base plate 9 since the retention device 7 is constructed in the lower region of FIG. 6 so as to be movable relative to the outer extruded profile-member 3 and consequently cannot act as a fixing means.

The inner extruded profile-member 2 according to FIG. 6 has a groove channel 14 for a toothed belt and a groove channel 15 for a measuring strip, the toothed belt which is used being able to cooperate with a drive device which brings about a relative movement between the inner extruded profile-member 2 and outer extruded profile-member 3. The measuring strip used in the groove channel 15 can be used in this instance to determine the relative movement between the inner extruded profile-member 2 and outer extruded profile-member 3.

FIG. 7 shows a linear guide 1 having a four-part outer extruded profile-member 3. The retention devices 7 illustrated at the top and on the right in FIG. 7 are securely connected to the outer extruded profile-member 3, whilst the retention devices 7 illustrated on the left and at the bottom in FIG. 7 are connected to the outer extruded profile-member 3 so as to be able to be moved relative to the outer extruded profile-member 3 by means of fitting screws having a sliding bush 11. Between the movably arranged retention devices 7 and the outer extruded profile-member 3, there is arranged a base plate 9, respectively, which plates fix the position of the individual parts of the outer extruded profile-member 3 relative to each other.

The position of the individual parts of the outer extruded profile-member 3 in the upper and right-hand region of FIG. 7 is determined by means of the retention devices 7 which are securely connected to the outer extruded profile-member 3.

A sliding member 5 is securely connected to the retention devices 7 in each case. The sliding members 5 each cooperate with a linear guiding rail 4, which are arranged in each case in a guiding groove 6 in the inner extruded profile-member 2 and securely connected to the inner extruded profile-member 2.

In FIG. 7, it can be seen that, from opposing retention devices 7, one is in each case securely connected to the outer extruded profile-member 3, whilst the other retention device 7 is connected to the outer extruded profile-member 3 so as to be able to be moved relative to the outer extruded profile-member 3. Dimensional tolerances are thereby able to be compensated for in two directions.

FIG. 8 shows another variant of the linear guide according to the invention. As in the embodiments previously described, the linear guiding means are constructed between the outer extruded profile-member 3 and the inner extruded profile-member 2 at the side illustrated at the bottom in the figure as fixed bearings, whereas the linear guide is constructed at the diametrically opposed side of the linear guide as a movable bearing. The construction of the fixed bearing side, that is to say, the linear guiding means illustrated at the bottom in FIG. 8, is in accordance with the embodiment illustrated in FIGS. 3 and 4, the same components being given the same reference numerals.

The movable bearing side is constructed differently in so far as the sliding member 5 which is secured to the outer extruded profile-member 3 has at that location a plurality of degrees of freedom. As already mentioned in the introduction, not only are height tolerances of the inner extruded profile-member 2 and the linear guiding rails 4 thereby compensated for, but also any imprecise running or tolerances transversely relative to the guiding direction of the extruded profile-members 2, 3. The sliding member 5 of the movable bearing side is securely provided with a ball head 16, which is retained in a bearing seat 17 which forms a ball joint with the ball head 16. The bearing seat 17 is formed by two mutually complementary ball plates 18a, 18b, of which the upper ball plate 18a has a dome-like recess and the lower ball plate 18b has a circular aperture with an edge which is circular-arc-like in cross section.

The sliding member 5 of the movable bearing side may have, in place of a ball head 16, a barrel-shaped bearing pin which has a spherical or round covering face. Such a bearing pin may, for example, be displaceably guided in a cylindrical bearing bush so that any bearing seat in the context of the above description can be dispensed with. A resiliently loaded bearing is not necessarily required.

The ball plates 18a, 18b are arranged in a floating manner, that is to say, transversely relative to the guiding direction of the extruded profile-members 2, 3 inside a bearing calliper member 19 and are pretensioned by means of compression springs 20 in the direction towards the linear guiding rail 4. The compression springs 20 are not necessarily required for the operation and in particular for tolerance compensation. The bearing calliper member 19 is securely screwed to the outer extruded profile-member 3.

LIST OF REFERENCE NUMERALS

1 Linear guide
2 Inner extruded profile-member
3 Outer extruded profile-member
4 Linear guiding rail
5 Sliding member
6 Guiding groove
7 Retention device
8 Sliding block
9 Base plate
10 Grub screws
11 Fitting screw with sliding bush
12 Recess
13 Screw arrangement
14 Groove channel for toothed belt
15 Groove channel for measuring strip
16 Ball head
17 Bearing seat
18a, 18b Ball plates
19 Bearing calliper member
20 Compression

What is claimed is:

1. A linear guide comprising:
at least one inner profile-member and at least one outer profile-member,
the outer profile-member at least partially surrounding the inner profile-member and the profile-members being guided one inside the other by at least two linear guiding means which are arranged diametrically opposite each other,
wherein the at least two linear guiding means each have a linear guiding rail and a complementary sliding member,
wherein the at least two linear guiding means comprise a first linear guiding means,
wherein the sliding member of the first linear guiding means is arranged in a floating manner,
wherein the sliding member of the first linear guiding means is displaceable within predetermined limits transversely relative to a guiding direction of the profile-members,
wherein the sliding member of the first linear guiding means includes a ball head rotatably arranged in a ball joint,
wherein the sliding members are each connected to the outer profile-member by a retention device, and
wherein the sliding member of the first linear guiding means is retained by the ball joint in a bearing seat arranged in a bearing calliper member in a floating manner.

2. The linear guide as claimed in claim 1, wherein the at least two linear guiding means further comprises a second linear guiding means, and the second linear guiding means forms a fixed bearing.

3. The linear guide as claimed in claim 1, wherein the sliding member of the first linear guiding means is resiliently loaded transversely relative to the guiding direction of the profile-members.

4. The linear guide as claimed in claim 1, wherein at least one of the linear guiding rails is securely connected to the inner profile-member.

5. The linear guide as claimed in claim 4, wherein each of the linear guiding rails are securely connected to the inner profile-member.

6. The linear guide as claimed in claim 1, wherein at least one of the linear guiding rails is secured in a guiding groove of the inner profile-member by sliding blocks.

7. The linear guide as claimed in claim 1, wherein at least one of the sliding members is arranged on the outer profile-member.

8. The linear guide as claimed in claim 1, wherein a position of at least one of the sliding members relative to the outer profile-member is adjustable to center the inner profile-member in the outer profile-member.

9. The linear guide as claimed in claim 1, wherein the ball joint in the bearing seat is arranged in the bearing calliper member in a resiliently loaded manner.

10. A linear guide comprising:
at least one inner profile-member and at least one outer profile-member,
the outer profile-member at least partially surrounding the inner profile-member and the profile-members being guided one inside the other by at least two linear guiding means which are arranged diametrically opposite each other,
wherein the at least two linear guiding means each have a linear guiding rail and a complementary sliding member,
wherein the at least two linear guiding means comprise a first linear guiding means,
wherein the sliding member of the first linear guiding means is arranged in a floating manner,
wherein the sliding member of the first linear guiding means is displaceable within predetermined limits transversely relative to a guiding direction of the profile-members,
wherein the sliding member of the first linear guiding means includes a ball head rotatably arranged in a ball joint,
wherein the sliding members are each connected to the outer profile-member by a retention device, and
wherein each of the retention devices is secured to the outer profile-member by sliding bushes.

11. The linear guide as claimed in claim 10, wherein the at least two linear guiding means further comprises a second linear guiding means, and the second linear guiding means forms a fixed bearing.

12. The linear guide as claimed in claim 10, wherein the sliding member of the first linear guiding means is resiliently loaded transversely relative to the guiding direction of the profile-members.

13. The linear guide as claimed in claim 10, wherein at least one of the linear guiding rails is securely connected to the inner profile-member.

14. The linear guide as claimed in claim 13, wherein each of the linear guiding rails are securely connected to the inner profile-member.

15. The linear guide as claimed in claim 10, wherein at least one of the linear guiding rails is secured in a guiding groove of the inner profile-member by sliding blocks.

16. The linear guide as claimed in claim 10, wherein at least one of the sliding members is arranged on the outer profile-member.

17. The linear guide as claimed in claim 10, wherein a position of at least one of the sliding members relative to the outer profile-member is adjustable to center the inner profile-member in the outer profile-member.

18. The linear guide as claimed in claim 10, wherein the sliding member of the first linear guiding means is retained by the ball joint in a bearing seat arranged in a bearing calliper member in a floating manner.

19. The linear guide as claimed in claim 18, wherein the ball joint in the bearing seat is arranged in the bearing calliper member in a resiliently loaded manner.

* * * * *